(12) United States Patent
Moore et al.

(10) Patent No.: US 11,027,997 B2
(45) Date of Patent: Jun. 8, 2021

(54) ANIMAL WASTE FILTER

(71) Applicant: Brian Moore, Martinez, CA (US)

(72) Inventors: Brian Moore, Martinez, CA (US); Ahmed Ismaiel, Martinez, CA (US)

(73) Assignee: Brian Moore, Martinez, CA (US)

( * ) Notice: Subject to any disclaimer, the term of this patent is extended or adjusted under 35 U.S.C. 154(b) by 0 days.

(21) Appl. No.: 15/992,087

(22) Filed: May 29, 2018

(65) Prior Publication Data
US 2019/0367394 A1    Dec. 5, 2019

(51) Int. Cl.
| | | |
|---|---|---|
| *C02F 3/28* | (2006.01) | |
| *C02F 1/00* | (2006.01) | |
| *B01D 39/16* | (2006.01) | |
| *B01D 24/00* | (2006.01) | |
| *B01D 21/00* | (2006.01) | |
| *B01D 39/06* | (2006.01) | |
| *B01D 35/027* | (2006.01) | |
| *B01D 24/20* | (2006.01) | |
| *C02F 103/20* | (2006.01) | |

(52) U.S. Cl.
CPC ............ *C02F 3/288* (2013.01); *B01D 21/003* (2013.01); *B01D 21/0012* (2013.01); *B01D 24/007* (2013.01); *B01D 24/205* (2013.01); *B01D 39/1653* (2013.01); *B01D 2101/04* (2013.01); *C02F 2103/20* (2013.01)

(58) Field of Classification Search
CPC ...... C02F 3/288; C02F 2103/20; C02F 1/001; B01D 24/205; B01D 21/003; B01D 24/007; B01D 39/1653; B01D 21/0012; B01D 2101/04; B01D 39/06; B01D 39/1676; B01D 35/027

USPC ..................................................... 210/170.08
See application file for complete search history.

(56) References Cited

U.S. PATENT DOCUMENTS

| | | | | |
|---|---|---|---|---|
| 1,861,481 A | * | 6/1932 | Rabjohn ................. | C02F 1/003 210/317 |
| 3,306,447 A | * | 2/1967 | Medeiros ................. | C02F 3/30 210/121 |
| 3,382,983 A | * | 5/1968 | Stewart ................. | B01D 24/12 210/266 |

(Continued)

FOREIGN PATENT DOCUMENTS

WO        WO-8900977 A1 *    2/2009    ............... C02F 1/28

*Primary Examiner* — Nam X Nguyen
*Assistant Examiner* — Ekandra S. Miller-Cruz
(74) *Attorney, Agent, or Firm* — Bayramoglu Law Offices LLC

(57) ABSTRACT

The present invention solves the problem of environmental pollution created by animal waste and converting animal waste to reusable water in the earth. The invention does this by a device that is capable of receiving animal waste and breaking down the waste into different components by the help of a decomposing catalyst such as a septic pack, filtering the resulting solution and finally producing a filtered liquid that enters the earth being cleansed by the process. The present invention comprises a filter device, a tank unit, a filter unit, a first opening positioned on a top surface of the tank unit; a second opening positioned on a bottom surface of the tank unit; wherein the tank unit is capable of receiving animal waste through the first opening; at least one hole at a bottom surface of the filter unit; wherein the tank unit is placed over the filter unit.

16 Claims, 11 Drawing Sheets

(56) References Cited

U.S. PATENT DOCUMENTS

| | | | | |
|---|---|---|---|---|
| 3,933,629 A | * | 1/1976 | Smith | C02F 3/10 |
| | | | | 210/618 |
| 4,189,386 A | * | 2/1980 | Aman | B01D 29/117 |
| | | | | 210/235 |
| 4,197,205 A | * | 4/1980 | Hirs | B01D 24/001 |
| | | | | 210/275 |
| 4,218,318 A | * | 8/1980 | Niimi | C02F 3/046 |
| | | | | 210/150 |
| 4,997,562 A | * | 3/1991 | Warner | E03F 11/00 |
| | | | | 210/259 |
| 5,449,453 A | * | 9/1995 | Tang | B01D 24/4631 |
| | | | | 210/108 |
| 5,589,081 A | * | 12/1996 | Harris | B01D 29/23 |
| | | | | 210/804 |
| 5,653,944 A | * | 8/1997 | Shimizu | B01D 53/73 |
| | | | | 422/168 |
| 5,693,220 A | * | 12/1997 | Sceusa | A01K 63/042 |
| | | | | 119/211 |
| 6,383,372 B1 | * | 5/2002 | Houck | B01D 24/042 |
| | | | | 210/150 |
| 6,737,020 B1 | * | 5/2004 | Horton, III | A61L 2/0011 |
| | | | | 210/748.11 |
| 7,744,755 B2 | * | 6/2010 | Miyazaki | C02F 3/10 |
| | | | | 210/151 |
| 8,029,674 B2 | * | 10/2011 | Lytle | C02F 3/06 |
| | | | | 210/617 |
| 2008/0017574 A1 | * | 1/2008 | Lenger | C02F 3/101 |
| | | | | 210/610 |
| 2014/0020557 A1 | * | 1/2014 | Zhou | B01D 53/229 |
| | | | | 95/51 |
| 2014/0305856 A1 | * | 10/2014 | Deskins | C05F 7/00 |
| | | | | 210/175 |

* cited by examiner

ANIMAL WASTE FILTER

TECHNICAL FIELD

The invention is in the field of environmental protection more specifically how to filter animal waste to create re-usable water.

BACKGROUND

As human and animal populations grow, it gets more challenging to protect the environment. One of the contributors to environment pollution is animal waste. Animal waste left in the environment may attract unwanted microorganisms while polluting the environment. While some of the animal waste may become fertilizers in environment, there is a problem of polluting environment by animal waste.

SUMMARY

The invention solves the problem of environmental pollution created by animal waste and converting animal waste to reusable water in the earth. The invention does this by a device that is capable of receiving animal waste and breaking down the waste into different components by the help of a decomposing catalyst such as a septic pack, filtering the resulting solution and finally producing a filtered liquid that can be released to earth as a clean liquid.

The device includes a container having at least one tank unit that is capable of receiving animal waste, the tank unit includes at least one section having a separating wall, at least one hole at the bottom of the tank, at least one filter unit used for filtering the liquid entering into the filter unit, and at least one hole at the bottom of the container.

The animal waste enters the tank from an opening (lid) at the top of the tank. Water is then poured into tank at the same level with the top of the separating wall. A decomposing catalyzer such as a septic pack or an equivalent of a septic pack is placed in the tank. The septic pack helps to decompose the animal waste that enters into the tank. When animal waste enters into the tank, it is decomposed by the help of the septic pack or a septic pack equivalent. The resulting overflow liquid flows through the hole at the bottom of the tank to the filter unit under the force of earth's gravity. The liquid is filtered by the filter material located in the filter unit. The filtered liquid goes through at least one hole located at the bottom of the container. The container is placed down into the soil such that the filtered liquid coming out of at least one hole on the bottom of container enters into the ground.

DETAILED DESCRIPTION OF THE EMBODIMENTS

The invention now will be described by providing different embodiments. It should be noted that the invention is not limited by the present embodiments. These embodiments are presented to describe the invention in specific applications and should not be considered as limiting the invention to these embodiments only.

The invention is a filter device for filtering animal waste.

Figure 1:
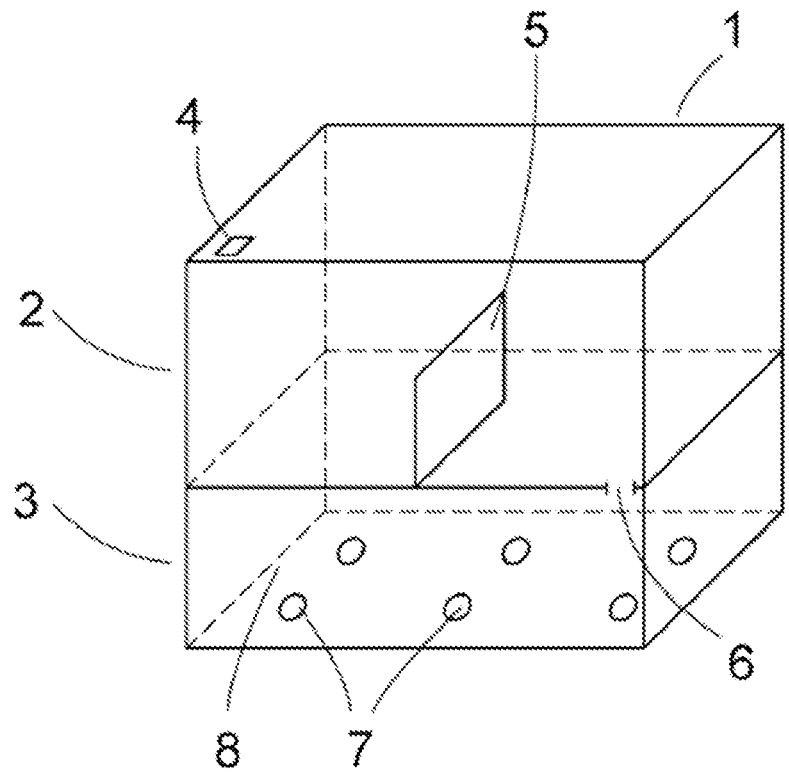
FIG. 1 shows the perspective view of the first embodiment of the animal waste filtering device.

FIG. 1 shows the first embodiment of the invention. In this embodiment, filter device 1 comprises tank unit 2 and filter unit 3. Tank unit 2 and filter unit 3 can be built as one unit with a separating wall between them. Alternatively, tank unit 2 and filter unit 3 can be built separately and can be combined to form filter device 1. While the shape of filter device 1 shown in FIG. 1 has a rectangular shape, the shape can be any suitable shape. For example, various shapes could include a sphere, a cylinder, a football shape or any other suitable shape. The material for filter device 1 can be any durable material. It is preferred that the material is non-biodegradable, however biodegradable material may also be used. Examples of materials that can be used to build filter device 1 is ABS plastic but the material is not limited by ABS plastic only. Filter device 1 has first opening 4 at the top surface of filter device 1. The first opening 4 is used to put animal waste into filter device 1. In FIG. 1, first opening 4 is shown as having a square shape. However, the shape can be any shape. For example, a circle, a rectangle, an oval or any other shape where animal waste can be placed into the filter device 1 through first opening 4 can be used. FIG. 1 shows that a single first opening 4 is placed in the corner of the top surface of filter device 1. The embodiment is not limited by what is shown in FIG. 1. The location of opening 4 can be anywhere on the top surface of filter device 1. In a preferred embodiment, opening 4 is placed as shown in FIG. 1. There may be multiple first openings 4 on the top surface of filter device 1.

Figure 2:
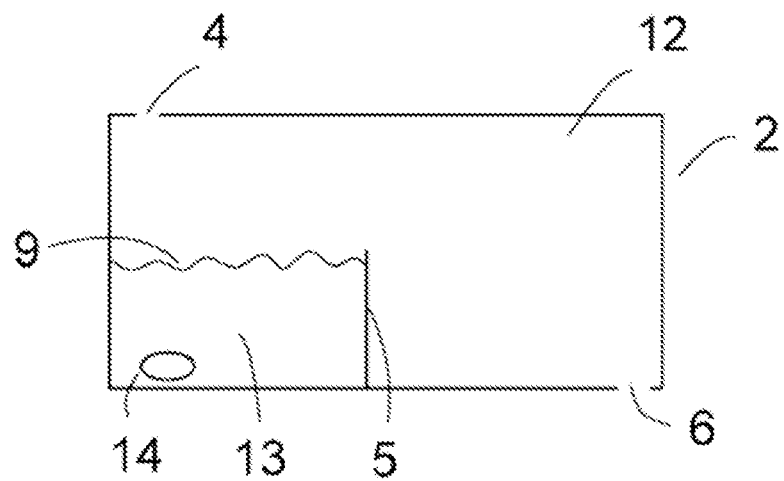
FIG. 2 shows the cross section of the tank unit of the first embodiment of the animal waste filtering device.

FIG. 2 shows the cross section of tank unit 2. Tank unit 2 comprises a cavity 12, separator 5, and first opening 4, and second opening 6, and decomposing catalyzer 14. A liquid is placed in section 13 such that the level of the liquid is the same as the height of separator 5. Separator 5 prevents liquid in section 13 from flowing out of section 13 unless an overflow occurs. The liquid is preferably water; however, any suitable liquid can be used. An example of decomposing catalyzer 14 can be a septic pack which helps decompose the animal waste. When animal waste is placed in tank unit 2 through first opening 4, the animal waste will fall into section 13 and will be decomposed with the help of decomposing catalyzer 14. When animal waste falls inside section 13, the liquid level 9 of section 13 goes above separator 5 and spills over into cavity 12 and finally goes through second opening 6. Filter device 1 works with the force of earth's gravity, meaning, the liquid motion through second opening 6 is accomplished under the force of the earth's gravity.

Figure 3:
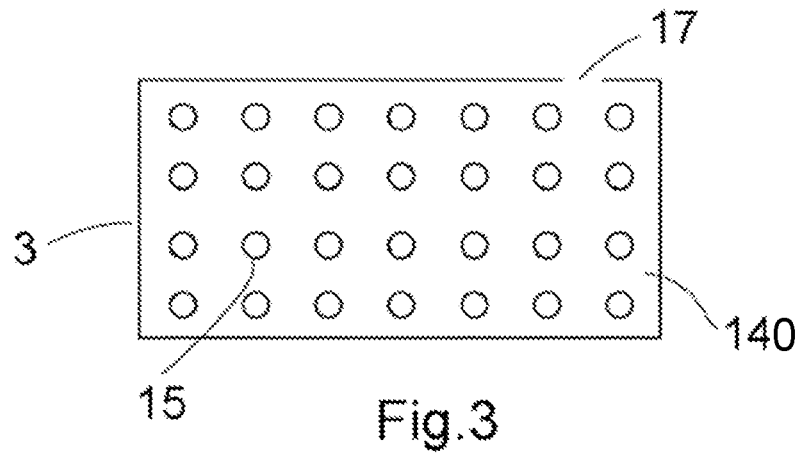
FIG. 3 shows the filter unit of the first embodiment of the animal waste filtering device.

FIG. 3 shows filter unit 3 of the first embodiment of filter device 1. Filter unit 3 comprises a cavity 140, third opening 17, and filter material 15. If tank unit 2 and filter unit 3 are built as separate units then second opening 6 on filter unit 3 and third opening 17 on tank unit 2 are in a matching location such that when tank unit 2 is placed on top of filter unit 3, second opening 6 and third opening 17 placed on top of each other and liquid goes from tank unit 2 into filter unit 3 through the second opening 6 and third opening 17. In a preferred embodiment, filter unit 3 and tank unit 2 are built as a one unit with a separating wall between them; the separating wall having at least a second opening 6. Filter unit 3 is filled with filter material 15 to filter the liquid entering into filter unit 2 from second opening 6. Filter material 15 can be any material that is capable of filtering the liquid entering into cavity 140 of filter unit 3. In a preferred embodiment polystyrene foam particles are used. In a different embodiment rocks can be used to filter the liquid.

Figure 4:
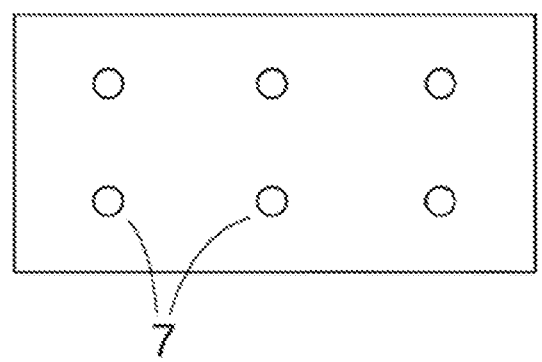
FIG. 4 shows the bottom view of the filter unit of the first embodiment of the animal waste filtering device.

FIG. 4 shows the bottom view of filter unit 3. At least one hole 7 is placed on the bottom surface of filter unit 3. There may be plurality of holes as shown in FIG. 4. While the shapes of plurality of holes 7 in FIG. 4 shown as circles, any shape that would allow filtered liquid to drain from cavity 140 can be used. For example, the shape of plurality of holes 7 can be square, rectangle, oval or any other suitable shape to allow liquid pass through.

Figure 5:
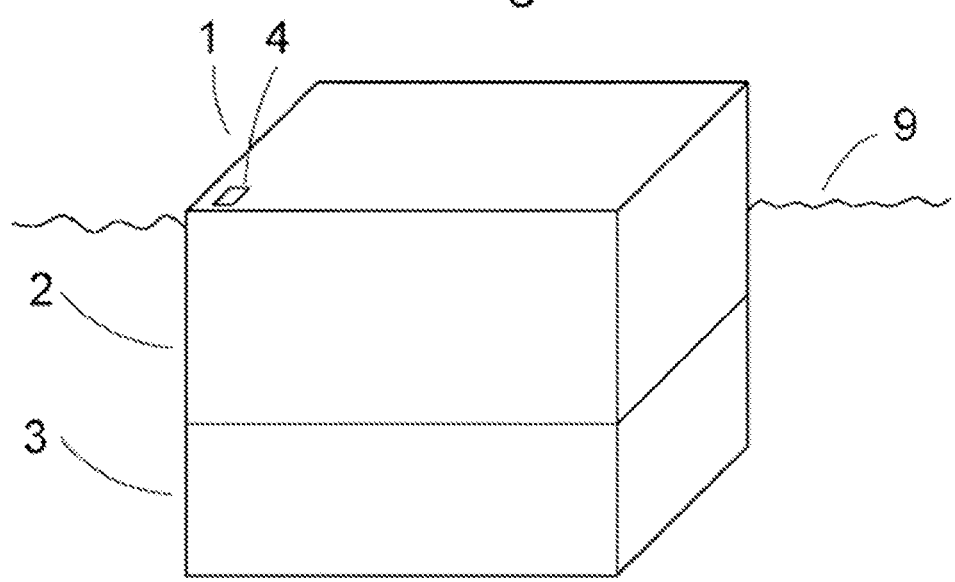
FIG. 5 shows the animal waste filtering device placed in the soil.

FIG. 5 shows filter device 1 being placed in ground. Ground level 9 can be at any level that would provide a stable position for filter device 1. Filter device 1 works in the following way: animal waste is placed in filter device 1 through first opening 4. Animal waste falls into section 13 and decomposes with the help of decomposer catalyzer 14. Upon animal waste entering into section 13 of tank unit 2, liquid level 9 of liquid in section 13 overflows and enters into cavity 12 of tank unit 2. The liquid that overflows from section 13 eventually reaches second opening 6 and leaves cavity 12 through second opening 6 under the force of earth's gravity. The liquid that goes through second opening 6 enters into filter section through either second opening 6 or third opening 17 depending upon if tank unit 2 and filter unit 3 are built as one unit or as separate units respectively. As discussed earlier, filter unit 3 and tank unit 2 can be a single unit or can be separate units. If filter unit 3 and tank unit 2 form one unit then there is only one second opening 6 between filter unit 3 and tank unit 2. The liquid entering in cavity 14 of filter unit 3 is filtered by filter material 15 and leaves cavity 140 of filter unit 3 through hole 7 that is located on the bottom surface of filter unit 3. As discussed above, there may be one hole 7 or plurality of holes 7. The liquid that leaves through hole 7 is a relatively clear liquid and liquid enters into ground upon going through hole 7.

Figure 6:
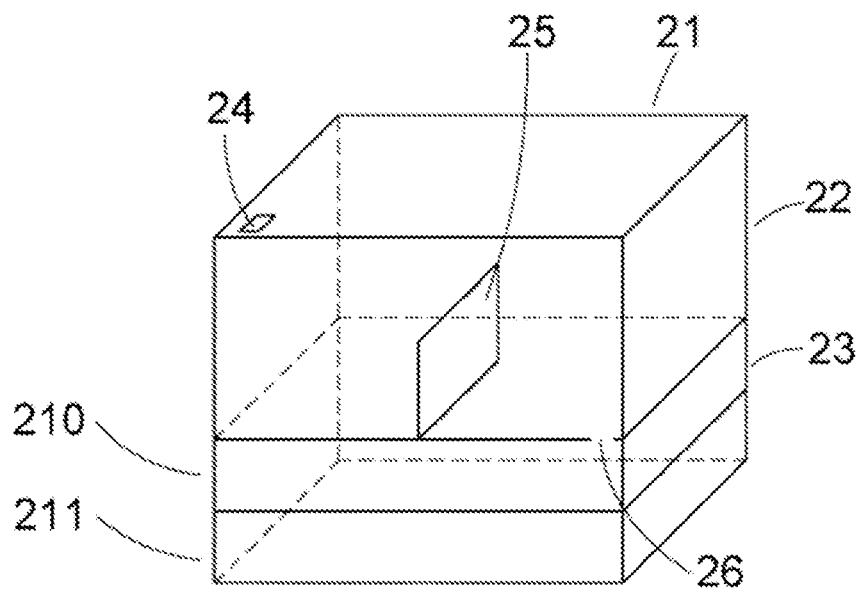
FIG. 6 shows the perspective view of the second embodiment of the animal waste filtering device.

FIG. 6 shows the second embodiment of the invention. In this embodiment, filter device 21 comprises tank unit 22 and filter unit 23. Tank unit 22 and filter unit 23 can be built as a one unit with a separating wall between them. Alternatively, tank unit 22 and filter unit 23 can be built separately and can be combined to form the filter device 21. While the shape of filter device 21 shown in FIG. 6 has a rectangular shape, the shape can be any suitable shape for example a sphere, a cylinder, a football shape or any other suitable shape. The material for filter device 21 can be any durable material. It is preferred that the material is non-biodegradable, however biodegradable material may also be used. Examples of materials that can be used to build filter device 21 is ABS plastic but the material is not limited to ABS plastic only. Filter device 21 has first opening 24 at the top surface. First opening 24 is used to put animal waste into filter device 21. In FIG. 6, first opening 24 is shown as having a square shape. However, the shape can be any shape. For example, a circle, a rectangle, an oval or any other shape where animal waste can be placed into filter device 21 through first opening 24 can be used. FIG. 6 shows that a single first opening 24 is placed in the corner of the top surface of filter device 21. The embodiment is not limited by what is shown in FIG. 6. The location of opening 24 can be anywhere on the top surface of filter device 21. In a preferred embodiment, opening 24 is placed as shown in FIG. 6. There may be multiple first openings 24 on the top surface of filter device 21.

Figure 7:
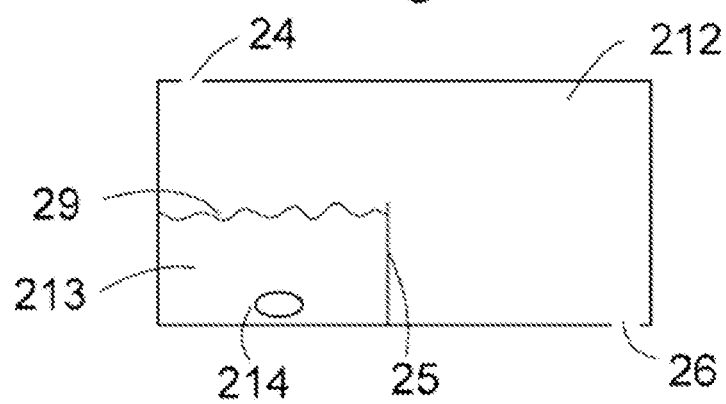
FIG. 7 shows the cross section of the tank unit of the second embodiment of the animal waste filtering device.

FIG. 7 shows the cross-section view of tank unit 22. Tank unit 22 comprises a cavity 212, separator 25, and first opening 24, and second opening 26, and decomposing catalyzer 214. A liquid is placed in section 213 such that the level of the liquid is the same as the height of separator 25. Separator 25 prevents liquid in section 213 from flowing out of section 213 unless an overflow occurs. The liquid is preferably water; however, any suitable liquid can be used. An example of decomposing catalyzer 214 can be a septic pack which helps decompose animal waste. When animal waste is placed in tank unit 22 through first opening 24, the animal waste will fall into section 213 and will be decomposed with the help of decomposing catalyzer 214. When animal waste falls inside section 213, the liquid level 29 of section 213 goes above separator 25 and spills over into cavity 212 and finally goes through second opening 26.

Filter device 21 works with the force of earth's gravity, meaning, the liquid motion through second opening 26 is accomplished under the force of earth gravity.

Figure 8:
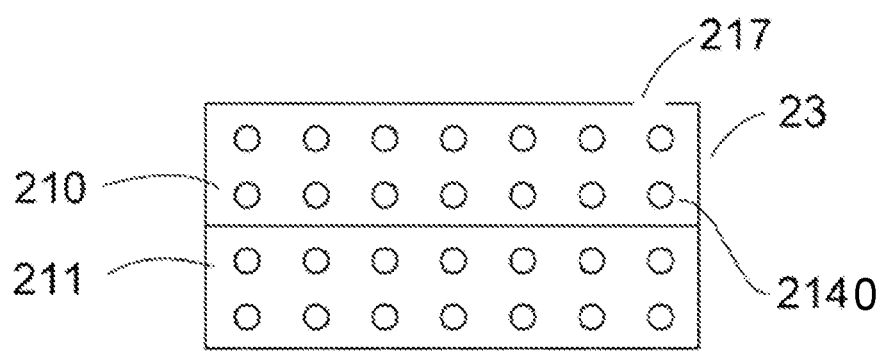
FIG. 8 shows the cross section of the filter unit of the second embodiment of the animal waste filtering device.

FIG. 8 shows filter unit 23 of the second embodiment of filter device 21. Filter unit 23 comprises a cavity 2140, third opening 217, and first filter material 210 and second filter material 211. If tank unit 2 and filter unit 3 are built as separate units then second opening 26 on tank unit 22 and third opening 17 on filter unit 23 are in a matching location such that when tank unit 22 is placed on top of filter unit 23, second opening 26 and third opening 217 placed on top of each other and liquid goes from tank unit 22 to filter unit 23 through second opening 26 and third opening 217. In a preferred embodiment, filter unit 23 and tank unit 22 are built as a one unit with a separating wall between them, separating wall having at least a second opening 26. Filter unit 23 is filled with first filter material 210 and second filter material 211 to filter the liquid entering the filter unit 22 from second opening 26. First filter material 210 is placed on top of second filter material 211 so that two layers of filtering is accomplished. First filter material 210 and second filter material 211 can be any material that is capable of filtering the liquid entering into cavity 2140 of filter unit 23. In a preferred embodiment, polystyrene foam particles are used for first filter material 210 and rocks, preferably, gravel particles are used for second filter material 211. In another embodiment pieces of rocks are used as first filter material 210 and pieces of rocks are used as second filter material 211.

Figure 9:
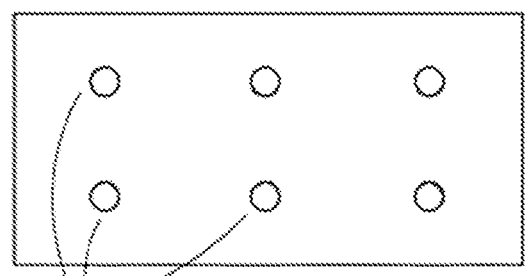
FIG. 9 shows the bottom view of the filter unit of the second embodiment of the animal waste filtering device.

FIG. 9 shows the bottom view of filter unit 23. At least one hole 27 is placed on the bottom surface of filter unit 23. There may be plurality of holes as shown in FIG. 9. While the shapes of plurality of holes 27 in FIG. 9 shown as circles, any shape that would allow filtered liquid drain from cavity 2140 can be used. For example, the shape of plurality of holes 27 can be square, rectangle, oval or any other suitable shape.

Filter device 21 is placed in ground just as it is done in the first embodiment described earlier.

Figure 10:
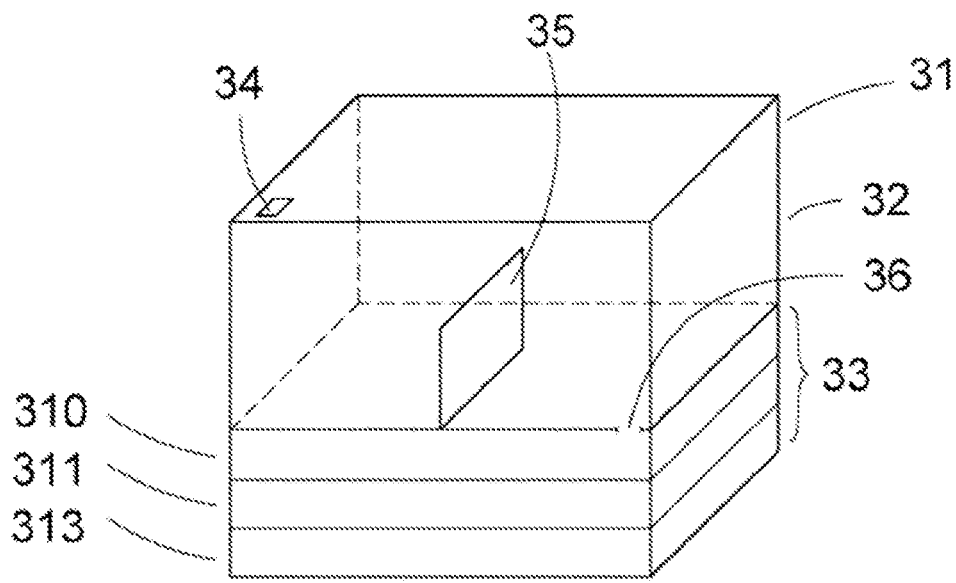
FIG. 10 shows the perspective view of the third embodiment of the animal waste filtering device.

FIG. 10 shows the third embodiment of the invention. In this embodiment, filter device 31 comprises tank unit 32 and filter unit 33. Tank unit 32 and filter unit 33 can be built as one unit with a separating wall between them. Alternatively, tank unit 32 and filter unit 33 can be built separately and can be combined to form the filter device 31. While the shape of filter device 31 shown in FIG. 10 has a rectangular shape, the shape can be any suitable shape for example a sphere, a cylinder, a football shape or any other suitable shape. The material for filter device 31 can be any durable material. It is preferred that the material is non-biodegradable, however biodegradable material may also be used. Examples of materials that can be used to build filter device 31 is ABS plastic but the material is not limited to ABS plastic only. Filter device 31 has first opening 34 at the top surface. First opening 34 is used to put animal waste into filter device 31. In FIG. 10, first opening 34 is shown as having a square shape. However, the shape can be any shape. For example, a circle, a rectangle, an oval or any other shape where animal waste can be placed into filter device 31 through first opening 34 can be used. FIG. 10 shows that a single first opening 34 is placed in the corner of the top surface of filter device 31. The embodiment is not limited by what is shown in FIG. 10. The location of opening 34 can be anywhere on the top surface of filter device 31. In a preferred embodiment, opening 34 is placed as shown in FIG. 10. There may be multiple first openings 34 on the top surface of filter device 31.

Figure 11:
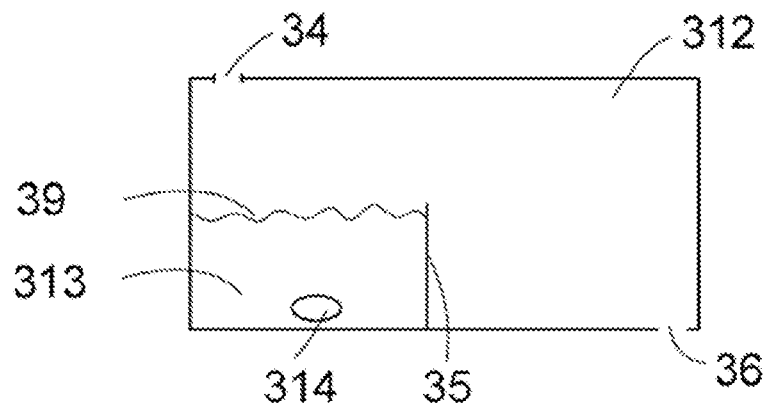
FIG. 11 shows the cross section of the tank unit of the third embodiment of the animal waste filtering device.

FIG. 11 shows the cross section of tank unit 32. Tank unit 32 comprises cavity 312, separator 35, and first opening 34, and second opening 36, and decomposing catalyzer 314. A liquid is placed in section 313 such that the level of the liquid is the same as the height of separator 35. Separator 35 prevents liquid in section 313 from flowing out of section 313 unless an overflow occurs. The preferred liquid is water; however, any suitable liquid can be used. An example of decomposing catalyzer 314 can be a septic pack which helps decompose animal waste. When animal waste is placed in tank unit 32 through first opening 34, the animal waste will fall into section 313 and will be decomposed with the help of decomposing catalyzer 314. When animal waste falls inside section 313, the liquid level 39 of section 313 goes above separator 35 and spills over into cavity 312 and finally goes through second opening 36. Filter device 31 works with the force of earth's gravity, meaning, the liquid motion through second opening 36 is accomplished under the force of earth gravity.

Figure 12:
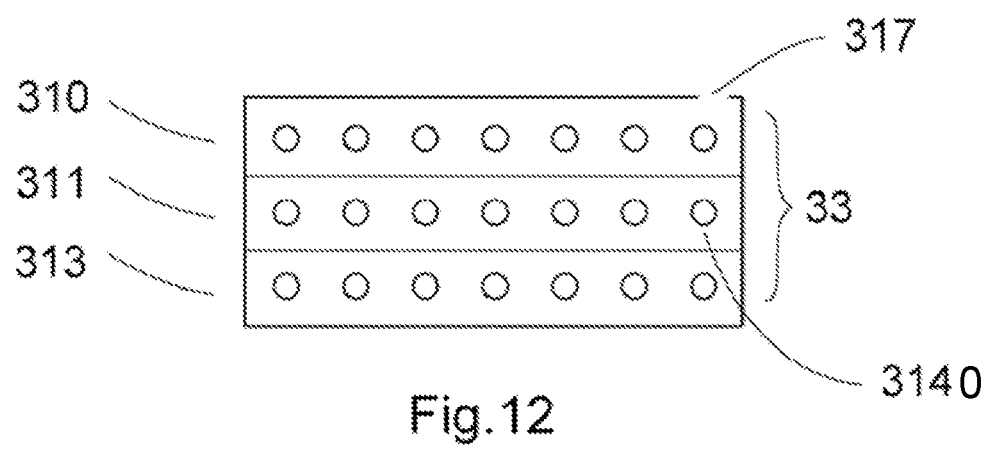
FIG. 12 shows the cross section of the filter unit of the third embodiment of the animal waste filtering device

FIG. 12 shows filter unit 33 of the third embodiment of filter device 31. Filter unit 33 comprises a cavity 3140, third opening 317, and first filter material 310, second filter material 311, and third filter material 320. If tank unit 32 and filter unit 33 are built as separate units then second opening 36 on tank unit 32 and third opening 317 on filter unit 33 are in a matching location such that when tank unit 32 is placed on top of filter unit 33, second opening 36 and third opening 317 placed on top of each other and liquid goes from tank unit 32 to filter unit 33 through second opening 36 and third opening 317. In a preferred embodiment, filter unit 33 and tank unit 32 are built as a one unit with a separating wall between them, separating wall having at least a second opening 36. Filter unit 33 is filled with first filter material 310, second filter material 311, and third filter material 320. First filter material 310, second filter material 311, and third filter material 320 are used to filter the liquid entering into filter unit 33 from second opening 36. First filter material 110 is placed on top of second filter material 311. Second filter material 311 is placed on top of third filter material 320. This way, three layers of filtering is accomplished. First filter material 310, second filter material 311, and third filter material 320 can be any material that is capable of filtering the liquid entering into cavity 3140 of filter unit 33. In a preferred embodiment polystyrene foam particles are used for first filter material 210 and rocks, preferably, gravel particles are used for second filter material 211, and rocks preferably gravel rocks are used as third filter material 320. In a preferred embodiment, the size of rocks used for second filter material 311 are larger than the size of rocks used as third filter material. Preferably, the size of rocks used as second filter material 311 are about 2.5 inches each and the size of rocks used as third filter material 320 are about 1.5 inches each.

Figure 13:
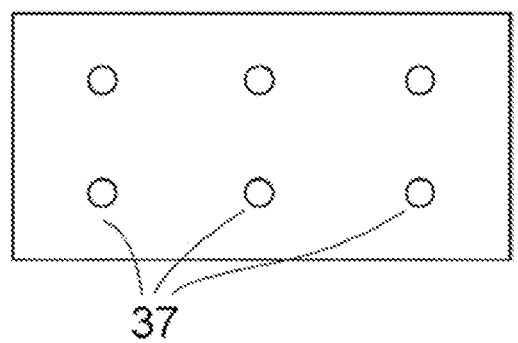
FIG. 13 shows the bottom view of the filter unit of the third embodiment of the animal waste filtering device.

FIG. 13 shows the bottom view of filter unit 33. At least one hole 37 is placed on the bottom surface of filter unit 33. There may be plurality of holes as shown in FIG. 13. While the shapes of plurality of holes 37 in FIG. 13 shown as circles, any shape that would allow filtered liquid drain from cavity 3140 can be used. For example, the shape of plurality of holes 37 can be square, rectangle, oval or any other suitable shape.

Filter device 31 is placed in ground just as it is done in the first embodiment described earlier.

Figure 14:
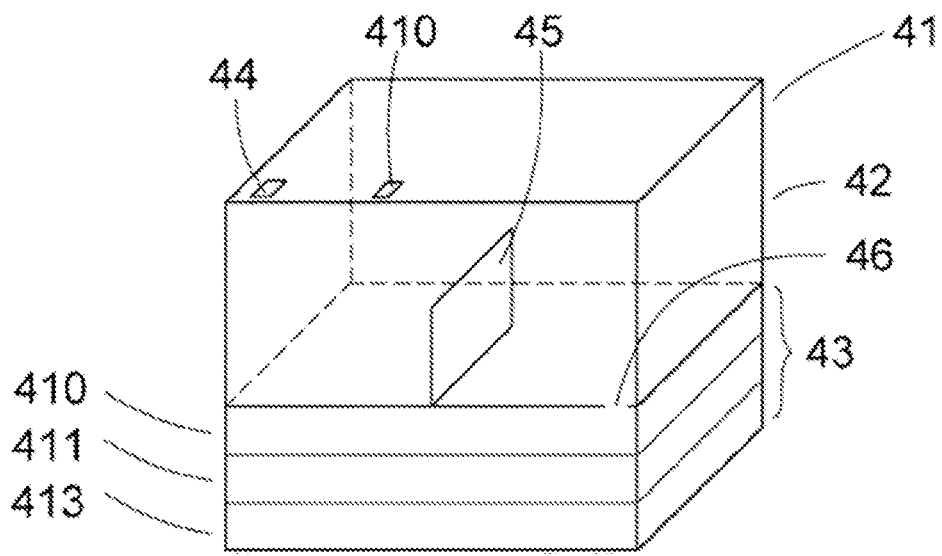
FIG. 14 shows the perspective view of the fourth embodiment of the animal waste filtering device.

FIG. 14 shows the fourth embodiment of the invention. In this embodiment, the filter device 41 comprises tank unit 42 and filter unit 43. Tank unit 42 and filter unit 43 can be built as one unit with a separating wall between them. Alternatively, tank unit 42 and filter unit 43 can be built separately and can be combined to form the filter device 41. While the shape of the filter device 41 shown in FIG. 14 has a rectangular shape, the shape can be any suitable shape for example a sphere, a cylinder, a football shape or any other suitable shape. The material for filter device 41 can be any durable material. It is preferred that the material is non-biodegradable, however biodegradable material may also be used. Examples of materials that can be used to build filter device 41 include ABS plastic but the material is not limited to ABS plastic only. Filter device 41 has first opening 44 at the top surface of filter device 41. First opening 44 is used to put animal waste into filter device 41. In FIG. 14, first opening 44 is shown as having a square shape. However, the shape can be any shape. For example, a circle, a rectangle, an oval or any other shape where animal waste can be placed into filter device 41 through first opening 44 can be used. FIG. 14 shows that a single first opening 44 is placed in the corner of the top surface of filter device 41. The embodiment is not limited by what is shown in FIG. 14. The location of opening 44 can be anywhere on the top surface of filter device 41. In a preferred embodiment, opening 44 is placed as shown in FIG. 14. There may be multiple first openings 44 on the top surface of filter device 31. A venting hole 410 is placed on the top surface of filter device 41 as shown in FIG. 14. Venting hole 410 allows unpleasant odors within filter unit 41 to escape from filter unit 41 through venting hole 410.

Filter device 41 is placed in ground just as it is done in the first embodiment described earlier.

Figure 15:
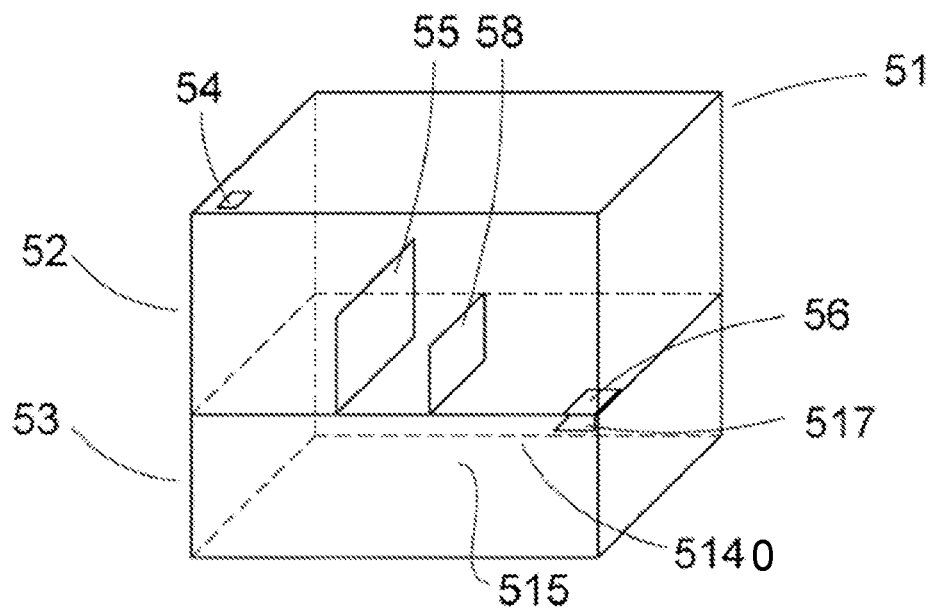
FIG. 15 shows the perspective view of the fifth embodiment of the animal waste filtering device.

FIG. 15 shows the fifth embodiment of the invention. In this embodiment, filter device 51 comprises tank unit 52 and filter unit 53. Tank unit 52 and filter unit 53 can be built as one unit with a separating wall between them. Alternatively, tank unit 52 and filter unit 53 can be built separately and can be combined to form the filter device 51. While the shape of the filter device shown in FIG. 15 has a rectangular shape, the shape can be any suitable shape for example a sphere, a cylinder, a football shape or any other suitable shape. The material for filter device 51 can be any durable material. It is preferred that the material is non-biodegradable, however biodegradable material may also be used. Examples of materials that can be used to build filter device 51 is ABS plastic but the material is not limited by ABS plastic only. Filter device 51 has first opening 54 at the top surface of filter device 51. First opening 54 is used to put animal waste into filter device 51. In FIG. 15, first opening 54 is shown as having a square shape. However, the shape can be any shape. For example, a circle, a rectangle, an oval or any other shape where animal waste can be placed into filter device 51 through first opening 54 can be used. FIG. 15 shows that a single first opening 54 is placed in the corner of the top surface of filter device 51. The embodiment is not limited by what is shown in FIG. 15. The location of opening 54 can be anywhere on the top surface of filter device 51. In a preferred embodiment, opening 54 is placed as shown in FIG. 15. There may be multiple first openings 54 on the top surface of filter device 51.

Figure 17:
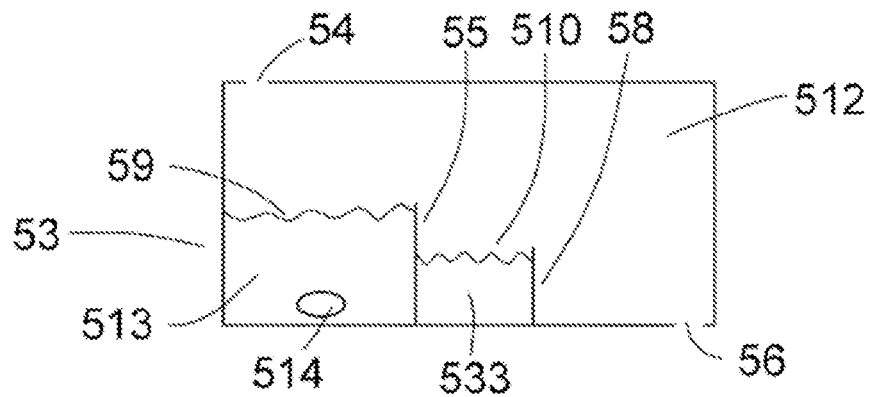
FIG. 17 shows the cross section of the tank unit of the fifth embodiment of the animal waste filtering device.

FIG. 17 shows the cross section of tank unit 52. Tank unit 52 comprises a cavity 512, first separator 55, second separator 58, first opening 54, second opening 56, and decomposing catalyzer 514. A liquid is placed in first section 513 and second section 533 such that the level of the liquid in first section 513 is the same as the height of first separator 55. The level of the liquid in second section 533 is the same as the height of second separator 58. First separator 55 prevents liquid in first section 513 from flowing out of first section 513 unless an overflow occurs. Second separator 58 prevents liquid in second section 533 from flowing out of second section 533 unless an overflow occurs. The liquid is preferably water; however, any suitable liquid can be used. An example of decomposing catalyzer 514 can be a septic pack which helps decompose animal waste. When animal waste is placed in tank unit 52 through first opening 54, the animal waste will fall into first section 513 and will be decomposed with the help of decomposing catalyzer 514. When animal waste falls inside first section 513, the liquid level 9 of first section 513 goes above separator 55 and spills over into second section 533. When liquid in first section 513 spills over into second section 533, level 510 in second section 533 reaches over second separator 58 and spills over into cavity 512 and finally goes through second opening 56. Filter device 1 works with the force of earth's gravity, meaning, the liquid motion through second opening 56 is accomplished under the force of earth gravity.

FIG. 15 shows filter unit 53 of the fifth embodiment of filter device 51. Filter unit 53 comprises a cavity 5140, third opening 517, and filter material 515. If tank unit 52 and filter unit 53 are built as separate units then second opening 56 on tank unit 52 and third opening 517 on filter unit 53 are in a matching location such that when tank unit 52 is placed on top of filter unit 53, second opening 56 and third opening 517 placed on top of each other and liquid goes from tank unit 52 to filter unit 53 through second opening 56 and third opening 517. In a preferred embodiment, filter unit 53 and tank unit 52 are built as one unit with a separating wall between them, separating wall having at least a second opening 56. Filter unit 53 is filled with filter material 515 to filter the liquid entering into filter unit 53 from second opening 56. Filter material 515 can be any material that is capable of filtering the liquid entering into cavity 5140 of filter unit 53. In a preferred embodiment polystyrene foam particles are used. In another embodiment pieces of rocks can be used as filter material 515.

Figure 16:
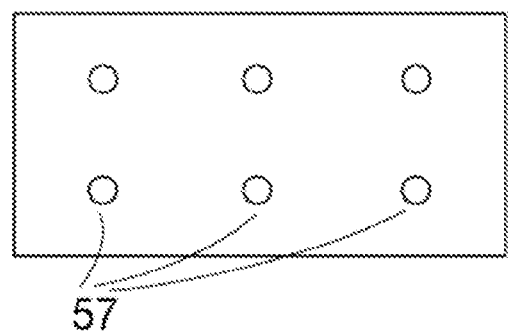
FIG. 16 shows the bottom view of the filter unit of the fifth embodiment of the animal waste filtering device.

FIG. 16 shows the bottom view of filter unit 53. At least one hole 57 is placed on the bottom surface of filter unit 53. There may be plurality of holes as shown in FIG. 16. While the shapes of plurality of holes 57 in FIG. 16 shown as circles, any shape that would allow filtered liquid drain from cavity 5140 can be used. For example, the shape of plurality of holes 57 can be square, rectangle, oval or any other suitable shape.

Filter device 51 is placed in ground just as it is done in the first embodiment described earlier.

Figure 18:
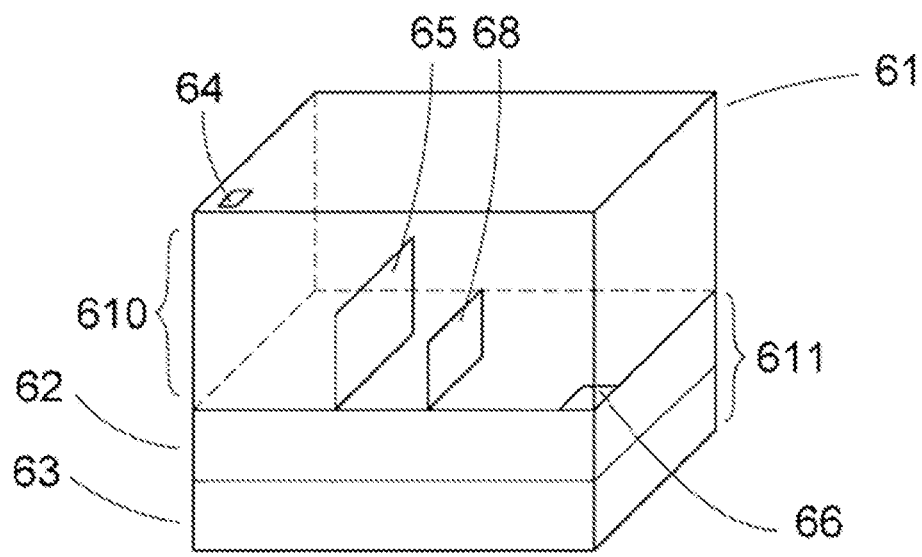
FIG. 18 shows the perspective view of the sixth embodiment of the animal waste filtering device.

FIG. 18 shows the sixth embodiment of the invention. In this embodiment, the filter device 61 comprises tank unit 610 and filter unit 611. Tank unit 610 and filter unit 611 can be built as one unit with a separating wall between them. Alternatively, tank unit 610 and filter unit 611 can be built separately and can be combined to form the filter device 61. While the shape of the filter device shown in FIG. 18 has a rectangular shape, the shape can be any suitable shape—for example a sphere, a cylinder, a football shape or any other suitable shape. The material for filter device 61 can be any durable material. It is preferred that the material is non-biodegradable, however biodegradable material may also be used. Examples of materials that can be used to build filter device 61 is ABS plastic but the material is not limited by ABS plastic only. Filter device 61 has first opening 64 at the top surface. First opening 64 is used to put animal waste into filter device 61. In FIG. 18, first opening 64 is shown as having a square shape. However, the shape can be any shape. For example, a circle, a rectangle, an oval or any other shape where animal waste can be placed into filter device 61 through first opening 64 can be used. FIG. 18 shows that a single first opening 64 is placed in the corner of the top surface of filter device 61. The embodiment is not limited by what is shown in FIG. 18. The location of opening 64 can be anywhere on the top surface of filter device 61. In a preferred embodiment, opening 64 is placed as shown in FIG. 18. There may be multiple first openings 64 on the top surface of filter device 61.

Figure 19:
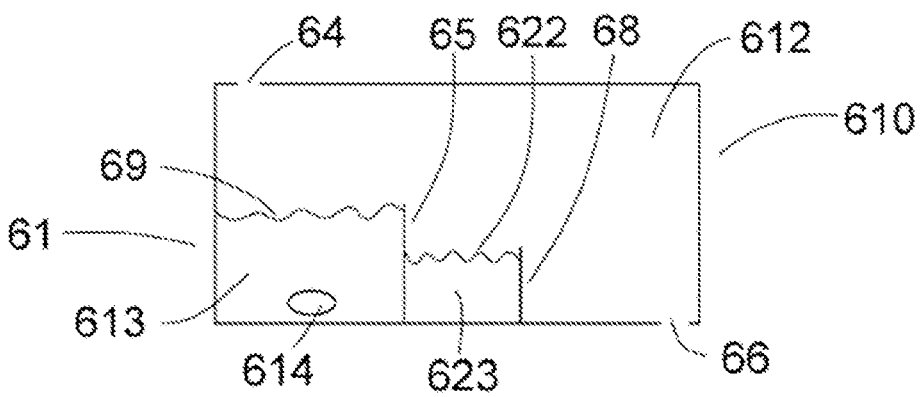
FIG. 19 shows the cross section of the tank unit of the sixth embodiment of the animal waste filtering device.

FIG. 19 shows the cross section of tank unit 610. Tank unit 610 comprises a cavity 612, first separator 65, second separator 68, first opening 64, second opening 66, and decomposing catalyzer 614. A liquid is placed in first section 613 and second section 623 such that level of the liquid 69 in first section 613 is the same as the height of first separator 65. The level of the liquid 622 in second section 623 is the same as the height of second separator 68. First separator 65 prevents liquid in first section 613 from flowing out of first section 613 unless an overflow occurs. Second separator 68 prevents liquid in second section 623 from flowing out of second section 623 unless an overflow occurs. The liquid is preferably water; however, any suitable liquid can be used. An example of decomposing catalyzer 614 can be a septic pack which helps decompose animal waste. When animal waste is placed in tank unit 610 through first opening 64, the animal waste will fall into first section 613 and will be decomposed with the help of decomposing catalyzer 614. When animal waste falls inside first section 613, the liquid level 69 of first section 613 goes above separator 65 and spills over into second section 623. When animal waste falls inside second section 623, the liquid level 622 of second section 623 goes above separator 68 and spills over into cavity 612 and finally goes through second opening 66. Filter device 61 works with the force of earth's gravity, meaning, the liquid motion through second opening 66 is accomplished under the force of earth gravity.

Figure 20:
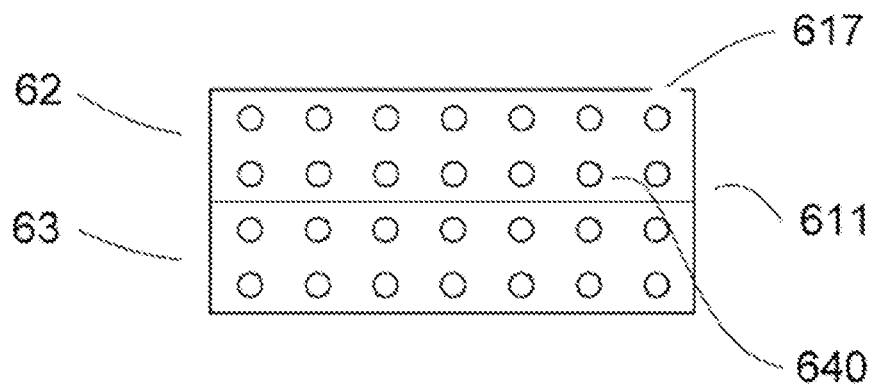
FIG. 20 shows the cross section of the filter unit of the sixth embodiment of the animal waste filtering device.

FIG. 20 shows the cross-section view of filter unit 611 of the sixth embodiment of filter device 61. Filter unit 611 comprises a cavity 640, third opening 617, and first filter material 62 and second filter material 63. If tank unit 610 and filter unit 611 are built as separate units then second opening 66 on tank unit 610 and third opening 617 on filter unit 611 are in a matching location such that when tank unit 610 is placed on top of filter unit 611, second opening 66 and third opening 617 placed on top of each other and liquid goes from tank unit 610 to filter unit 611 through second opening 66 and third opening 617. In a preferred embodiment, filter unit 611 and tank unit 610 are built as one unit with a separating wall between them, separating wall having at least a second opening 66. Filter unit 611 is filled with first filter material 62 and second filter material 63 to filter the liquid entering into filter unit 611 from second opening 66. First filter material 62 is placed on top of second filter material 63 so that two layers of filtering is accomplished. First filter material 62 and second filter material 63 can be any material that is capable of filtering the liquid entering into cavity 640 of filter unit 611. In a preferred embodiment, polystyrene foam particles are used for first filter material 62 and rocks, preferably, gravel particles are used for second filter material 63. In another embodiment, rock particles are used for first filter material 62, and rock particles are used for second filter material 63. In that configuration, the size of rock pieces in first filter material 62 are larger than the size of rock particles in second filter material 63.

Figure 21:
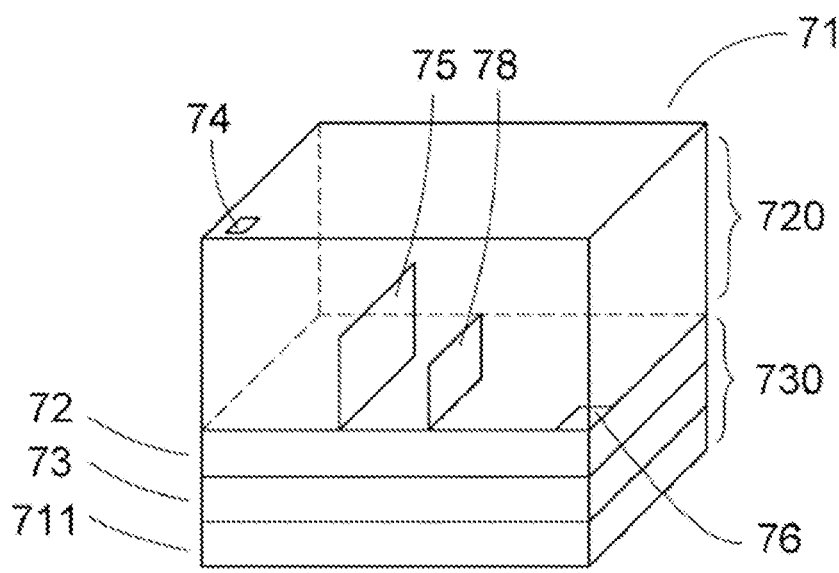
FIG. 21 shows the perspective view of the seventh embodiment of the animal waste filtering device.

FIG. 21 shows the seventh embodiment of the invention. In this embodiment, the filter device 71 comprises tank unit 720 and filter unit 730. Tank unit 720 and filter unit 730 can be built as one unit with a separating wall between them. Alternatively, tank unit 720 and filter unit 730 can be built separately and can be combined to form the filter device 71. While the shape of the filter device shown in FIG. 21 has a rectangular shape, the shape can be any suitable shape for example a sphere, a cylinder, a football shape or any other suitable shape. The material for filter device 71 can be any durable material. It is preferred that the material is non-biodegradable, however biodegradable material may also be used. Examples of materials that can be used to build filter device 71 include ABS plastic but the material is not limited by ABS plastic only. Filter device 71 has first opening 74 at the top surface. First opening 74 is used to put animal waste into filter device 71. In FIG. 21, first opening 74 is shown as having a square shape. However, the shape can be any shape. For example, a circle, a rectangle, an oval or any other shape where animal waste can be placed into filter device 71 through first opening 74 can be used. FIG. 21 shows that a single first opening 74 is placed in the corner of the top surface of filter device 71. The embodiment is not limited by what is shown in FIG. 21. The location of opening 74 can be anywhere on the top surface of filter device 71. In a preferred embodiment, opening 74 is placed as shown in FIG. 21. There may be multiple first openings 74 on the top surface of filter device 71.

Figure 22:
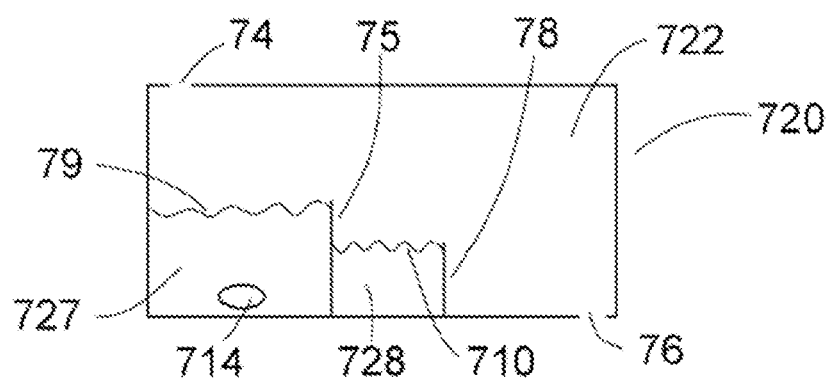
FIG. 22 shows the cross section of the tank unit of the seventh embodiment of the animal waste filtering device.

FIG. 22 shows the cross section of tank unit 720. Tank unit 720 comprises cavity 722, first separator 75, second separator 78, first opening 74, second opening 76, and decomposing catalyzer 714. A liquid is placed in first section 727 and second section 728 such that the level of the liquid 79 in first section 727 is the same as the height of first separator 75. The level of the liquid 710 in second section 728 is the same as the height of second separator 78. First separator 75 prevents liquid in first section 727 from flowing out of first section 727 unless an overflow occurs. Second separator 78 prevents liquid in second section 728 from flowing out of second section 728 unless an overflow occurs. The liquid is preferably water, however, any suitable liquid can be used. An example of decomposing catalyzer 714 can be a septic pack which helps decompose animal waste. When animal waste is placed in tank unit 720 through first opening 74, the animal waste will fall into first section 727 and will be decomposed with the help of decomposing catalyzer 714. When animal waste falls inside section 727, the liquid level 79 of first section 727 goes above separator 75 and spills over into second section 728. When animal waste falls inside second section 728, the liquid level 710 of second section 728 goes above separator 78 and spills over into cavity 722 and finally goes through second opening 76. Filter device 71 works with the force of earth's gravity, meaning, the liquid motion through second opening 76 is accomplished under the force of earth gravity.

Figure 23:
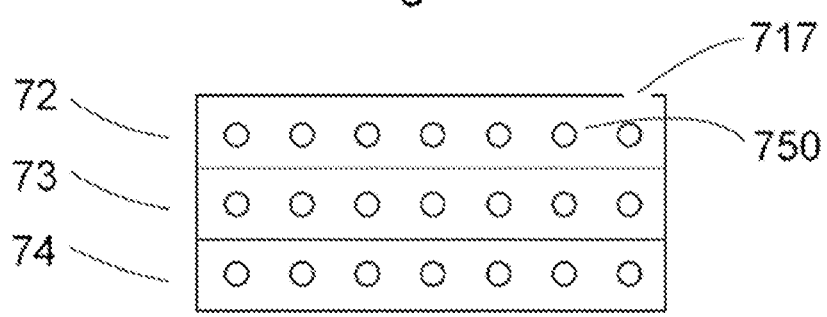
FIG. 23 shows the cross section of the filter unit of the seventh embodiment of the animal waste filtering device.

FIG. 23 shows filter unit 730 of the seventh embodiment of filter device 71. Filter unit 730 comprises a cavity 750, third opening 717, and first filter material 72, second filter material 73, and third filter material 74. If tank unit 720 and filter unit 730 are built as separate units then second opening 76 on tank unit 720 and third opening 717 on filter unit 730 are in a matching location such that when tank unit 720 is placed on top of filter unit 730, second opening 76 and third opening 717 placed on top of each other and liquid goes from tank unit 720 to filter unit 730 through second opening 76 and third opening 717. In a preferred embodiment, filter unit 730 and tank unit 720 are built as one unit with a separating wall between them, separating wall having at least second opening 76. Filter unit 730 is filled with first filter material 72, second filter material 73, and third filter material 74. First filter material 72, second filter material 73, and third filter material 74 are used to filter the liquid entering into filter unit 730 from second opening 76. First filter material 72 is placed on top of second filter material 73. Second filter material 73 is placed on top of third filter material 74. This way, three layers of filtering are accomplished. First filter material 72, second filter material 73, and third filter material 74 can be any material that is capable of filtering the liquid entering into cavity 750 of filter unit 730. In this preferred embodiment, polystyrene foam particles are used for first filter material 72 and rocks, preferably, gravel particles are used for second filter material 73, and rocks preferably gravel rocks are used as third filter material 74. In a preferred embodiment, the size of rocks used for second filter material 73 are larger than the size of rocks used as third filter material 74. Preferably, the size of rocks used as second filter material 73 are about 2.5 inches each and the size of rocks used as third filter material 74 are about 1.5 inches each. In another embodiment pieces of rocks are used for first filter material 72 and rocks, preferably, gravel particles are used for second filter material 73, and rocks preferably gravel rocks are used as third filter material 74. In a preferred embodiment, the size of rocks used for first filter material 72 are larger than rocks used for second filter material 73. Pieces of rocks are used as second filter material 73 are larger than the size of rocks used as third filter material 74. Preferably, the size of the rocks used as second filter material 73 are approximately 2.5 inches each and the size of rocks used as third filter material 74 are about 1.5 inches each.

Filter device 71 is placed in the ground just as it is done in the first embodiment described earlier.

Figure 24:
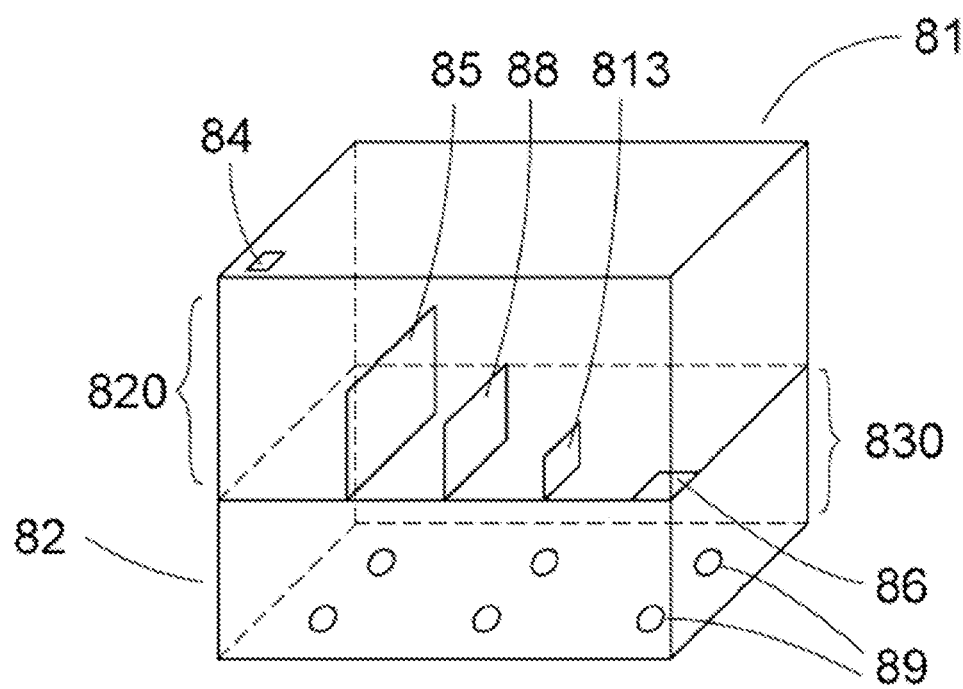
FIG. 24 shows the perspective view of the eighth embodiment of the animal waste filtering device.

FIG. 24 shows the eighth embodiment of the invention. In this embodiment, the filter device 81 comprises tank unit 820 and filter unit 830. Tank unit 820 and filter unit 830 can be built as one unit with a separating wall between them. Alternatively, tank unit 820 and filter unit 830 can be built separately and can be combined to form the filter device 81. While the shape of the filter device shown in FIG. 24 has a rectangular shape, the shape can be any suitable shape for example a sphere, a cylinder, a football shape or any other suitable shape. The material for filter device 81 can be any durable material. It is preferred that the material is non-biodegradable, however biodegradable material may also be used. Examples of materials that can be used to build filter device 81 include ABS plastic, but the material is not limited by ABS plastic only. Filter device 81 has first opening 84 at the top surface. First opening 84 is used to put animal waste into filter device 81. In FIG. 24, first opening 84 is shown as having a square shape. However, the shape can be any shape. For example, a circle, a rectangle, an oval or any other shape where animal waste can be placed into filter device 81 through first opening 84 can be used. FIG. 24 shows that a single first opening 84 is placed in the corner of the top surface of filter device 81. The embodiment is not limited by what is shown in FIG. 24. The location of opening 84 can be anywhere on the top surface of filter device 81. In a preferred embodiment, opening 84 is placed as shown in FIG. 24. There may be multiple first openings 84 on the top surface of filter device 81.

Figure 25:
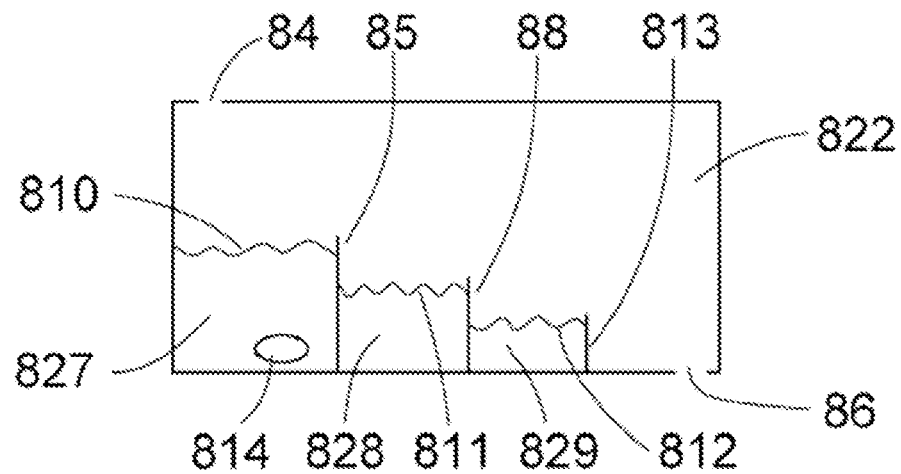
FIG. 25 shows the cross section of the tank unit of the eighth embodiment of the animal waste filtering device.

FIG. 25 shows the cross section of tank unit 820. Tank unit 820 comprises a cavity 822, first separator 85, second separator 88, third separator 813, first opening 84, second opening 86, and decomposing catalyzer 814. A liquid is placed in first section 827, second section 828, and third section 829 such that the level of the liquid 810 in first section 827 is the same as the height of first separator 85. The level of the liquid 811 in second section 828 is the same as the height of second separator 88. The level of the liquid 812 in third section 829 is the same as the height of third separator 813. First separator 85 prevents liquid in first section 827 from flowing out of first section 827 unless an overflow occurs. Second separator 88 prevents liquid in second section 828 from flowing out of second section 828 unless an overflow occurs. Third separator 813 prevents liquid in third section 829 from flowing out of third section 829 unless an overflow occurs. The liquid is preferably water, however, any suitable liquid can be used. An example of decomposing catalyzer 814 can be a septic pack which helps decompose animal waste. When animal waste is placed in tank unit 820 through first opening 84, the animal waste will fall into first section 827 and will be decomposed with the help of decomposing catalyzer 814. When animal waste falls inside first section 827, the liquid level 810 of first section 827 goes above separator 85 and spills over into second section 828. When liquid from first section 827 enters into second section 828, the liquid level 811 of second section 828 goes above separator 88 and spills over into third section 829. When the liquid level 812 of third section 829 goes above third separator 813, the liquid overflows into cavity 822 and finally goes through second opening 86. Filter device 81 works with the force of earth's gravity, meaning, the liquid motion through second opening 86 is accomplished under the force of earth gravity.

FIG. 24 shows filter unit 830 having a single layer of filter material. The filter material 82 can be either foam material or rock. The size of the foam or rock can be adjusted. Holes 89 placed at the bottom of filter unit 81, more specifically on the bottom surface of filter unit 830. While FIG. 24 shows plurality of holes, a single hole instead of plurality of holes can be used. The shape of hole 89 can be any shape including but not limited to circle, rectangle, square, oval or any other shape that would allow liquid flow through hole 89.

Filter device 81 can be placed in ground just as it is done in the first embodiment described earlier.

Figure 26:
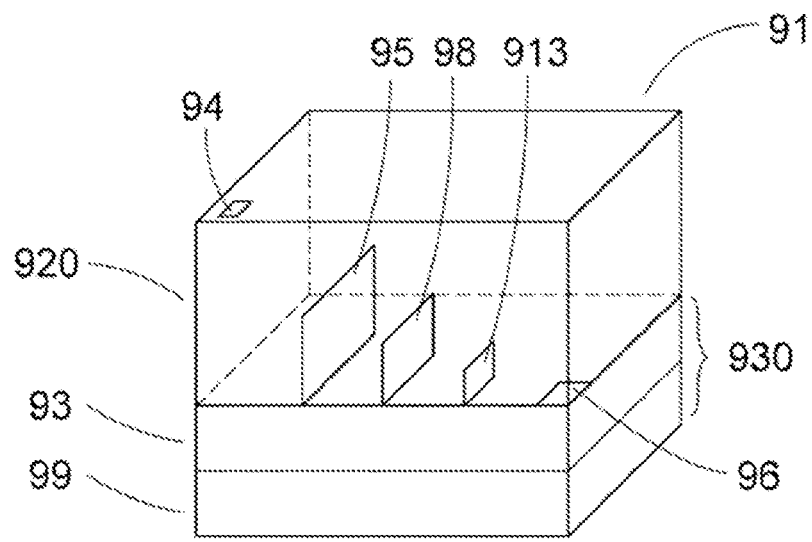
FIG. 26 shows the perspective view of the ninth embodiment of the animal waste filtering device.

FIG. 26 shows the ninth embodiment of the invention. In this embodiment, the filter device 91 comprises tank unit 920 and filter unit 930. Tank unit 920 and filter unit 930 can be built as a one unit with a separating wall between them. Alternatively, tank unit 920 and filter unit 930 can be built separately and can be combined to form the filter device 91. While the shape of the filter device shown in FIG. 26 has a rectangular shape, the shape can be any suitable shape for example a sphere, a cylinder, a football shape or any other suitable shape. The material for filter device 91 can be any durable material. It is preferred that the material is non-biodegradable, however biodegradable material may also be used. Examples of materials that can be used to build filter device 91 is ABS plastic but the material is not limited by ABS plastic only. Filter device 91 has first opening 94 at the top surface. First opening 94 is used to put animal waste into filter device 91. In FIG. 26, first opening 94 is shown as having a square shape. However, the shape can be any shape. For example, a circle, a rectangle, an oval or any other shape where animal waste can be placed into filter device 91 through first opening 94 can be used. FIG. 26 shows that a single first opening 94 is placed in the corner of the top surface of filter device 91. The embodiment is not limited by what is shown in FIG. 26. The location of opening 94 can be anywhere on the top surface of filter device 91. In a preferred embodiment, opening 94 is placed as shown in FIG. 26. There may be multiple first openings 94 on the top surface of filter device 91.

Figure 27:
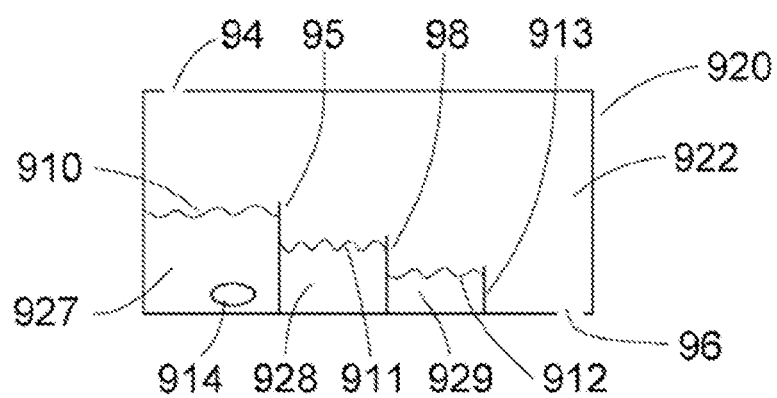
FIG. 27 shows the cross section of the tank unit of the ninth embodiment of the animal waste filtering device.

FIG. 27 shows the cross section of tank unit 920. Tank unit 920 comprises a cavity 922, first separator 95, second separator 98, third separator 913, first opening 94, second opening 96, and decomposing catalyzer 914. A liquid is placed in first section 927, second section 928, and third section 929 such that the level of the liquid 910 in first section 927 is the same as the height of first separator 95. The level of the liquid 911 in second section 928 is the same as the height of second separator 98. The level of the liquid 912 in third section 929 is the same as the height of third separator 913. First separator 95 prevents liquid in first section 927 from flowing out of first section 927 unless an overflow occurs. Second separator 98 prevents liquid in second section 928 from flowing out of second section 928 unless an overflow occurs. Third separator 913 prevents liquid in third section 929 from flowing out of third section 929 unless an overflow occurs. The liquid is preferably water, however, any suitable liquid can be used. An example of decomposing catalyzer 914 can be a septic pack which helps decompose animal waste. When animal waste is placed in tank unit 920 through first opening 94, the animal waste will fall into first section 927 and will be decomposed with the help of decomposing catalyzer 914. When animal waste falls inside first section 927, the liquid level 910 of first section 927 goes above separator 95 and spills over into second section 928. When liquid from first section 927 enters into second section 928, the liquid level 911 of second section 928 goes above separator 98 and liquid in second section 928 spills over into third section 929. When the liquid level 912 of third section 929 goes above third separator 913, the liquid in third section 929 overflows into cavity 922 and finally goes through second opening 96. Filter device 91 works with the force of earth's gravity, meaning, the liquid motion through second opening 96 is accomplished under the force of earth gravity.

Figure 28:
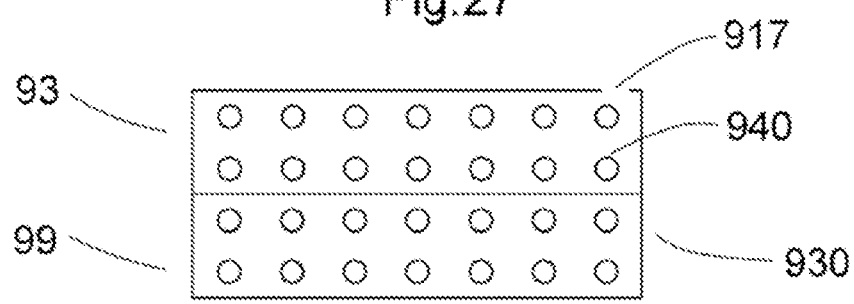
FIG. 28 shows the cross section of the filter unit of the ninth embodiment of the animal waste filtering device.

FIG. 28 shows the cross-section view of filter unit 930 of the ninth embodiment of filter device 91. Filter unit 930 comprises a cavity 940, third opening 917, and first filter material 93 and second filter material 99. If tank unit 920 and filter unit 930 are built as separate units then second opening 96 on tank unit 920 and third opening 917 on filter unit 930 are in a matching location such that when tank unit 920 is placed on top of filter unit 930, second opening 96 and third opening 917 placed on top of each other and liquid goes from tank unit 920 to filter unit 930 through second opening 96 and third opening 917. In a preferred embodiment, filter unit 930 and tank unit 920 are built as a one unit with a separating wall between them, separating wall having at least a second opening 96. Filter unit 930 is filled with first filter material 93 and second filter material 99 to filter the liquid entering into filter unit 930 from second opening 96. First filter material 93 is placed on top of second filter material 99 so that two layers of filtering is accomplished. First filter material 93 and second filter material 99 can be any material that is capable of filtering the liquid entering into cavity 940 of filter unit 930. In a preferred embodiment polystyrene foam particles are used for first filter material 93 and rocks, preferably, gravel particles are used for second filter material 99. In an alternative arrangement, gravel rocks can be used for first material 93 and gravel rocks can be used for second material 99. If rocks are used for both first filter material 93 and second filter material 99, it is preferred that the size of rocks in first filter material 93 are larger than the size of rocks in second filter material 99. Preferable the size of rocks in first filter material 93 has about 2.5 inches in diameter and the size of rocks in second filter material 99 has about 1.5 inches in diameter.

Filter device 91 can be placed in the ground just as it is done in the first embodiment described earlier.

Figure 29:
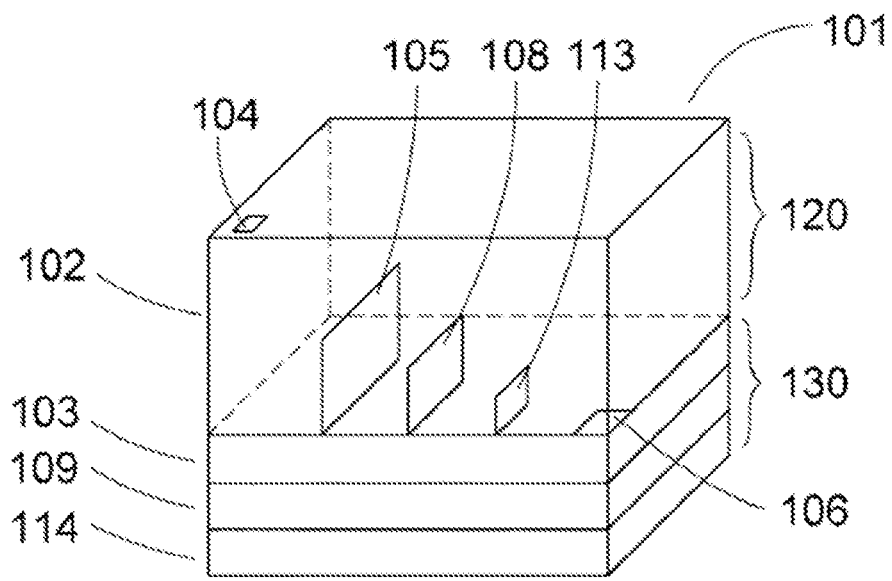
FIG. 29 shows the perspective view of the tenth embodiment of the animal waste filtering device.

FIG. 29 shows the tenth embodiment of the invention. In this embodiment, the filter device 101 comprises tank unit 120 and filter unit 130. Tank unit 120 and filter unit 130 can be built as a one unit with a separating wall between them. Alternatively, tank unit 120 and filter unit 130 can be built separately and can be combined to form the filter device 101. While the shape of the filter device shown in FIG. 29 has a rectangular shape, the shape can be any suitable shape for example a sphere, a cylinder, a football shape or any other suitable shape. The material for filter device 101 can be any durable material. It is preferred that the material is non-biodegradable, however biodegradable material may also be used. Examples of materials that can be used to build filter device 101 include ABS plastic but the material is not limited by ABS plastic only. Filter device 101 has first opening 104 at the top surface. First opening 104 is used to put animal waste into filter device 101. In FIG. 29, first opening 104 is shown as having a square shape. However, the shape can be any shape. For example, a circle, a rectangle, an oval or any other shape where animal waste can be placed into filter device 101 through first opening 104 can be used. FIG. 29 shows that a single first opening 104 is placed in the corner of the top surface of filter device 101. The embodiment is not limited by what is shown in FIG. 29. The location of opening 104 can be anywhere on the top surface of filter device 101. In a preferred embodiment, opening 104 is placed as shown in FIG. 29. There may be multiple first openings 104 on the top surface of filter device 101.

Figure 30:
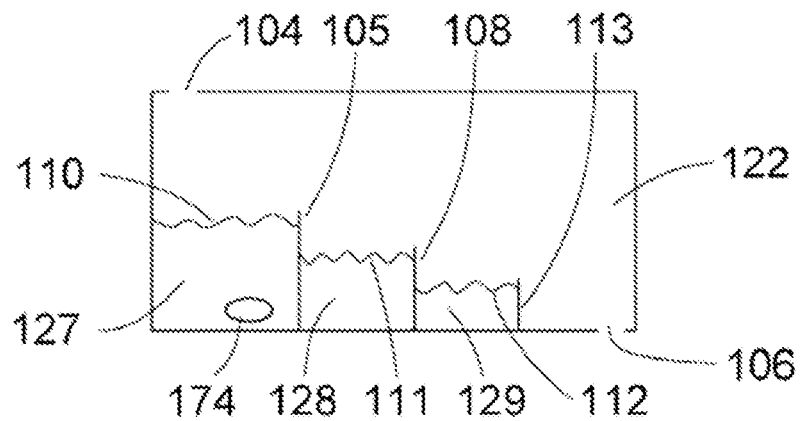
FIG. 30 shows the cross section of the tank unit of the tenth embodiment of the animal waste filtering device.

FIG. 30 shows the cross section of tank unit 120. Tank unit 120 comprises a cavity 122, first separator 105, second separator 108, third separator 113, first opening 104, second opening 106, and decomposing catalyzer 174. A liquid is placed in first section 127, second section 128, and third section 129 such that the level of the liquid 110 in first section 127 is the same as the height of first separator 105. The level of the liquid 111 in second section 128 is the same as the height of second separator 108. The level of the liquid 112 in third section 129 is the same as the height of third separator 113. First separator 105 prevents liquid in first section 127 from flowing out of first section 127 unless an overflow occurs. Second separator 108 prevents liquid in second section 128 from flowing out of second section 128 unless an overflow occurs. Third separator 113 prevents liquid in third section 129 from flowing out of third section 129 unless an overflow occurs. The liquid is preferably water, however, any suitable liquid can be used. An example of decomposing catalyzer 174 can be a septic pack which helps decompose animal waste. When animal waste is placed in tank unit 120 through first opening 104, the animal waste will fall into first section 127 and will be decomposed with the help of decomposing catalyzer 174. When animal waste falls inside first section 127, the liquid level 110 of first section 127 goes above separator 105 and spills over into second section 128. When liquid from first section 127 enters into second section 128, the liquid level 112 of second section 128 goes above separator 108 and liquid in second section 128 spills over into third section 129. When the liquid level 112 of third section 129 goes above third separator 113, the liquid in third section 129 overflows into cavity 122 and finally goes through second opening 106. Filter device 101 works with the force of earth's gravity, meaning, the liquid motion through second opening 106 is accomplished under the force of earth gravity.

Figure 31:
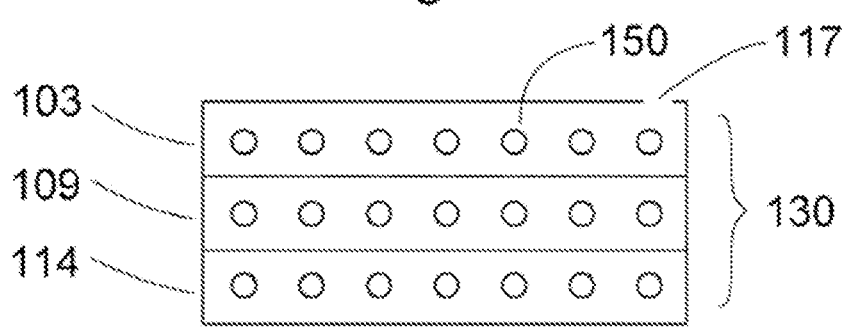
FIG. 31 shows the cross section of the filter unit of the tenth embodiment of the animal waste filtering device.

FIG. 31 shows filter unit 130 of the tenth embodiment of filter device 101. Filter unit 130 comprises a cavity 150, third opening 117, and first filter material 103, second filter material 109, and third filter material 114. If tank unit 120 and filter unit 130 are built as separate units, then second opening 106 on tank unit 120 and third opening 117 on filter unit 130 are in a matching location such that when tank unit 120 is placed on top of filter unit 130, second opening 106 and third opening 117 placed on top of each other and liquid goes from tank unit 120 to filter unit 130 through second opening 106 and third opening 117. In a preferred embodiment, filter unit 130 and tank unit 120 are built as a one unit with a separating wall between them, separating wall having at least a second opening 106. Filter unit 130 is filled with first filter material 103, second filter material 109, and third filter material 114. First filter material 103, second filter material 109, and third filter material 114 are used to filter the liquid entering into filter unit 130 from second opening 106. First filter material 103 is placed on top of second filter material 109. Second filter material 109 is placed on top of third filter material 114. This way, three layers of filtering are accomplished. First filter material 103, second filter material 109, and third filter material 114 can be any material that is capable of filtering the liquid entering into cavity 150 of filter unit 130. In this preferred embodiment, polystyrene foam particles are used for first filter material 103 and rocks, preferably, gravel particles are used for second filter material 109, and rocks preferably gravel rocks particles are used as third filter material 114. In a preferred embodiment, the size of rocks used for second filter material 109 are larger than the size of rocks used as third filter material 114. Preferably, the size of rocks used as second filter material 103 are approximately 2.5 inches each and the size of rocks used as third filter material 114 are approximately 1.5 inches each. In another arrangement, rocks can be used for first filter material 103, second filter material 109, and third filter material 114. When rocks are used for first filter material 103, second filter material 109, and third filter material 114, the size of rocks are larger for first filter material 103 than second filter material 109, and the size of rocks are larger for second filter material 109 than third filter material 114.

We claim:

1. A filter device for filtering animal waste, the filter device comprising:
   a tank unit;
   a filter unit;
   a first opening positioned on a top surface of the tank unit;
   a second opening positioned on a bottom surface of the tank unit; and
   at least one hole at a bottom surface of the filter unit;
   wherein the tank unit comprises: a tank cavity and a first vertical separating wall, wherein the first vertical separating wall separates a first section from the rest of the tank cavity, and the second opening is located at a bottom of the rest of the tank cavity,
   the tank unit is placed over the filter unit;
   the filter device further comprises a horizontal separating wall to separate the tank unit and the filter unit, and the horizontal separating wall is perpendicular to the first vertical separating wall of the tank unit;
   the tank unit receives animal waste through the first opening, and step-wise filtration of the animal waste is performed when a liquid level in the first section goes above the first vertical separating wall and spills over into the rest of the tank cavity and goes through the second opening, and
   the filter unit has a filter cavity wherein the filter cavity is filled with a first filter material for filtering liquid entering into the filter unit from the rest of the tank cavity through the second opening;
   the tank unit further comprises a decomposing catalyst, and the decomposing catalyst is a septic pack.

2. The filter device of claim 1 wherein the filter unit further comprises a second filter material such that the first filter material is placed over the second filter material.

3. The filter device of claim 2 wherein the filter unit further comprises a third filter material such that the first filter material is placed over the second filter material, and the second filter material is placed over the third filter material.

4. The filter device of claim 1, wherein the tank unit further comprises: a second separator, wherein the second separator separates a second section from the rest of the tank cavity.

5. The filter device of claim 2 wherein the tank unit further comprises: a second separator, wherein the second separator separates a second section from the rest of the tank cavity.

6. The filter device of claim 3 wherein the tank unit further comprises: a second separator, wherein the second separator separates a second section from the rest of the tank cavity.

7. The filter device of claim 4, wherein the tank unit further comprises: a third separator, wherein the third separator separates a third section from the rest of the tank cavity.

8. The filter device of claim 5, wherein the tank unit further comprises: a third separator, wherein the third separator separates a third section from the rest of the tank cavity.

9. The filter device of claim 6, wherein the tank unit further comprises: a third separator, wherein the third separator separates a third section from the rest of the tank cavity.

10. The filter device of claim 9, wherein the liquid is water.

11. The filter device of claim 9 wherein the first filter material is a polystyrene foam, the second filter material is pieces of a first rock, and the third filter material is pieces of a second rock.

12. The filter device of claim 11, wherein the size of the pieces of the first rock of the second filter material is larger than the size of the pieces of the second rock of the third filter material.

13. The filter device of claim 12, wherein the size of the pieces of the first rock in the second filter material are about 2.5 inches in diameter and the size of the pieces of the second rock in the third filter material are about 1.5 inches in diameter.

14. The filter device of claim 9, wherein the first filter material is pieces of a first rock, the second filter material is pieces of a second rock, and the third filter material is pieces of a third rock wherein the size of the pieces of the first rock of the first filter material is larger than the size of the pieces of the second rock of the second filter material, and the size of the pieces of the second rock of the second filter material is larger than the size of the pieces of the third rock of the third filter material.

15. The filter device of claim 11 wherein the first rock, and the second rock are the same type of rock or different type of rock.

16. The filter device of claim 11 wherein the second filter material is gravel pieces and the third filter material is gravel pieces.

* * * * *